UNITED STATES PATENT OFFICE.

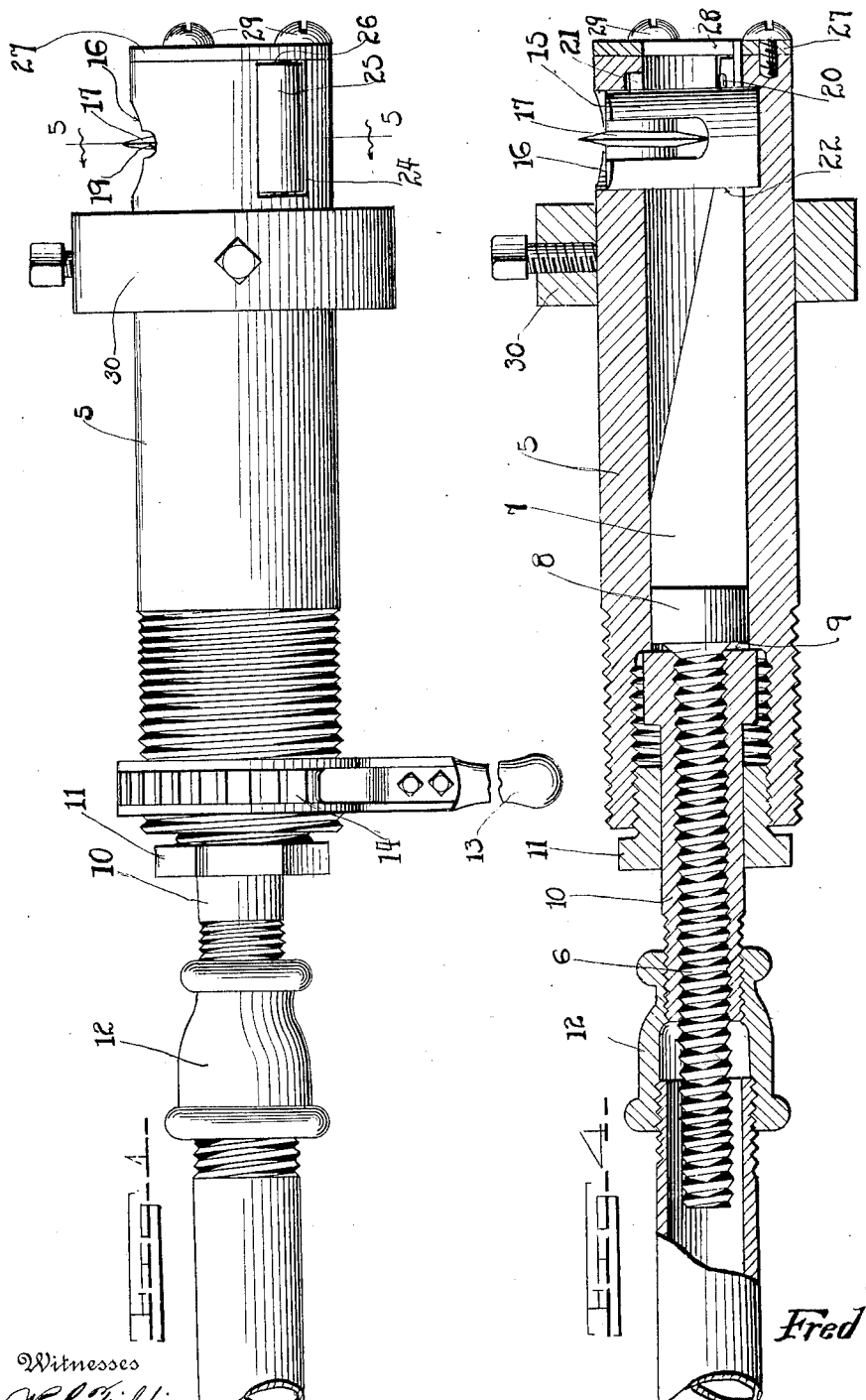

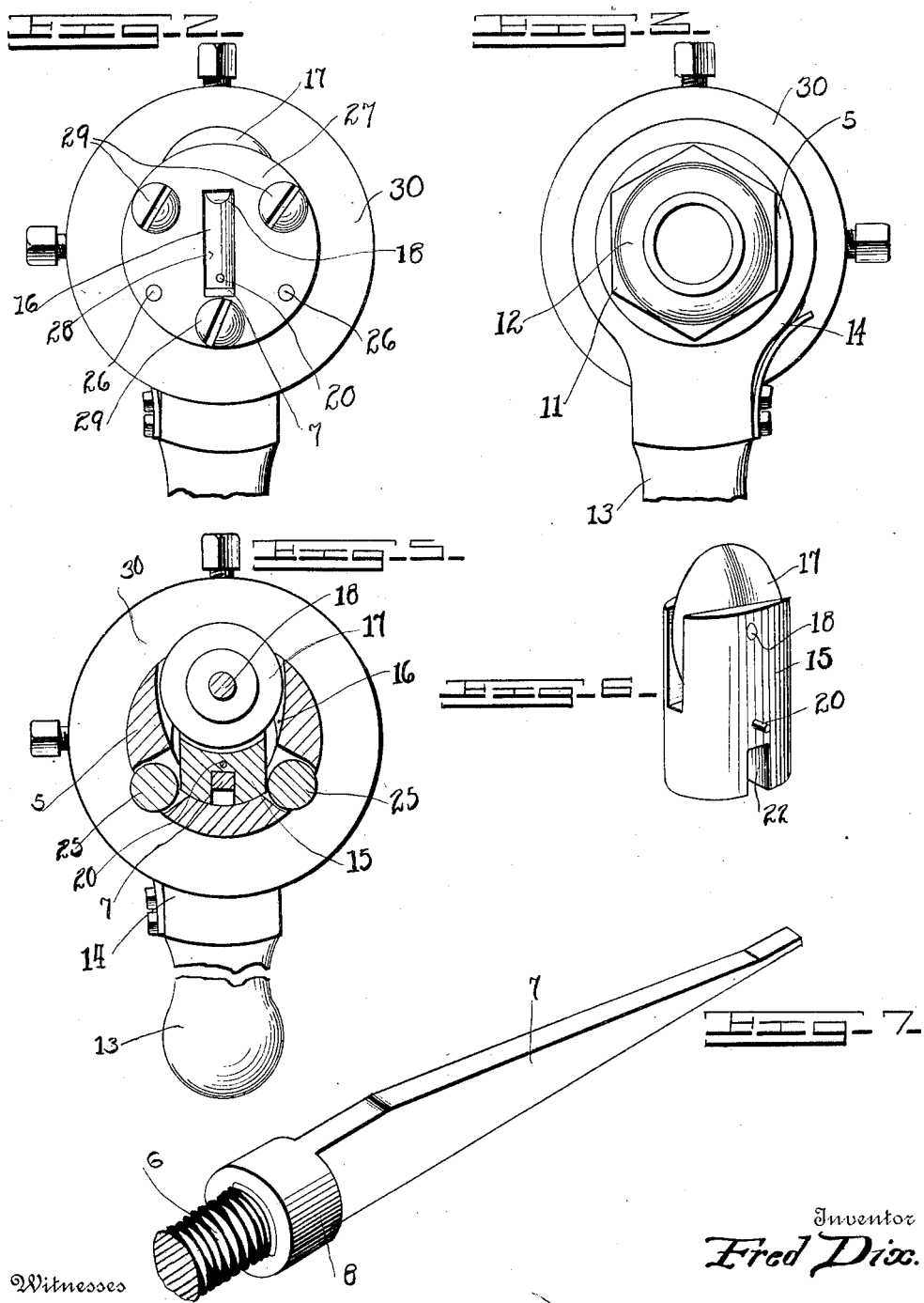
F. DIX.
FLUE CUTTER.
APPLICATION FILED NOV. 4, 1910.
1,089,463.
Patented Mar. 10, 1914.
2 SHEETS—SHEET 2.

FRED DIX, OF HARDTNER, KANSAS.

FLUE-CUTTER.

1,089,463. Specification of Letters Patent. Patented Mar. 10, 1914.

Application filed November 4, 1910. Serial No. 590,707.

*To all whom it may concern:*

Be it known that I, FRED DIX, a citizen of the United States, residing at Hardtner, in the county of Barber, State of Kansas, have invented certain new and useful Improvements in Flue-Cutters; and I do hereby declare the following to be a full, clear, and exact description of the invention, such as will enable others skilled in the art to which it appertains to make and use the same.

This invention relates to improvements in flue cutters and the leading object in view is the construction of a flue cutter having a rotatable cutter wheel adjustable thereon and improved means for adjusting the wheel.

Another object of the invention is the construction of a flue cutter having a laterally moving cutter wheel and a longitudinally operating screw wedge feed for forcing the cutter against the flue to be cut.

With the above and other objects in view the invention consists in certain constructions, combinations, and arrangements of parts clearly described in the following specification and clearly illustrated in the accompanying drawings; in which, Figure 1 is a side elevation of the improved flue cutter. Fig. 2 is a front end view thereof. Fig. 3 is a rear end view thereof. Fig. 4 is a central longitudinal sectional view. Fig. 5 is a transverse sectional view taken on the line 5—5 of Fig. 1. Fig. 6 is a detail perspective view of the cutter and the block for holding the same, and Fig. 7 is a detail perspective view of the wedge portion of the screw feed.

Referring to the accompanying drawings, 5 denotes the main body portion of the tool, said body portion being formed tubular to allow for the movement of the screw feeding shank 6, the outer end of which is provided with a wedge member or spreader 7. The rear end of the wedge member or spreader 7 is formed with a circular shoulder 8 which is snugly fitted in the body and adapted to abut against the shoulder or collar 9 of the sleeve 10 at the head end of the screw to limit the movement of the spreader longitudinally toward said shoulder, and the screw feed 6 is adapted to move against the internal screw threads of the sleeve 10. The forward portion of the outside of the sleeve 10 is formed smooth and a sleeve nut 11 is mounted thereon to engage with the internal screw threads of the outer end of the body 5 for swiveling the shoulder 9 to the body for permitting the body and screw to rotate together while the sleeve is stationary. On the outer end of the member 10 a splicing sleeve 12 is mounted so that one or more pipe sections or rods 12' may be connected therewith to form an extensible handle for the tool.

The rear end of the body 5 carries a ratchet handle 13 which is provided with a suitable ratchet 14 whereby the body 5 may be rotated on the handle and the member 10, it being understood that the ratchet member 14 is locked to the body in any suitable manner although it is shown as threaded thereon and locked sufficiently rigid to impart rotation to the body 5 when the handle 13 is reciprocated. The forward portion of the body 5 is preferably formed smooth and on the forward end of said body a block 15 slides in an opening 16. The outer end of the block 16 is bifurcated to receive a rotatable cutter disk or wheel 17 which is mounted on said outer end by a pivot 18, and the edge of said disk or wheel projects into extensions or slots 19 of the opening 16. The inner end of the block 15 is provided with a laterally extending pin 20 which moves in a slot 21 formed in the outer end of the body 5 and which is provided for the purpose of preventing the block 15 from rotating in the opening 16. The inner end of the block 15 is provided with a wedge-shaped slot 22 adapted to engage with the wedge member or spreader 7. When the tubular body 5 is rotated on the handle and member 10 in one direction the screw feed 6 will be moved outwardly of the member 10 and the block 15 carrying the cutter 17 will be moved laterally of the body 5.

The front end of the body 5 is formed with two radially spaced longitudinally extending slots 24 in which the friction rollers 25 are secured by the pivot pins 26 carried by the end plate 27, which plate is formed with a rectangular slot 28 to receive the terminal of the wedge member or spreader 7 and which is suitably secured to the front end of the body 5 by means of screws 29. The rollers 25 project slightly beyond the periphery of the body 5 so as to bear against the wall of the flue to be cut, whereby the friction of the body 5 on the flue wall will be greatly diminished. A collar 30 is movably mounted on the body 5 to form a stop for the body, and said collar is held in fixed position by means of set screws 31 carried by said collar and adapted to engage the outer surface of the body 5.

When the body 5 is rotated within the flue and the cutter 17 engages the inner wall of the flue the flue may be gradually cut thereby. As the body 5 is rotated by means of the handle 13 the screw feed 6 will be moved forwardly so that the wider portions of the wedge member 7 will engage with the wedge slot 22 of the holding block 15 and said holding block and the cutter carried thereby will be forced outwardly of the body portion 5 whereby the depth of the cut will be gradually increased and finally completed.

The improved tool is simple in construction and can be easily operated. The body 5 can be readily inserted in a flue by moving the screw feed to its rearmost position so that the cutter 17 will occupy its innermost position on said body.

What is claimed is:—

In a flue cutter, a tubular body having a lateral aperture, said body having its interior diameter enlarged and threaded at one end, a cutter carrier mounted in said aperture, a wedge slidable in said body and engaging the carrier to effect movement thereof, a headed screw slidable and rotatable in the body, a sleeve screwed into the threaded portion of the body, a second sleeve rotatable in the first sleeve and having a threaded bore receiving said screw, said second sleeve further having an enlarged end adapted to fit loosely between the bottom of the threaded portion of the body and the inner end of the first sleeve, and means to rotate the body and operate the second sleeve.

In testimony whereof, I affix my signature, in presence of two witnesses.

FRED DIX.

Witnesses:
PERMINDA SMITH,
CHARLES HOWLAND.

Copies of this patent may be obtained for five cents each, by addressing the "Commissioner of Patents, Washington, D. C."